United States Patent [19]

Fuisz et al.

[11] Patent Number: 5,447,423
[45] Date of Patent: Sep. 5, 1995

[54] APPARATUS FOR TRANSFORMING THE PHYSICAL STRUCTURE OF THERMO-FLOW MATERIALS

[75] Inventors: Richard C. Fuisz, Great Falls; Beuford A. Bogue, Broad Run, both of Va.

[73] Assignee: Fuisz Technologies, Ltd., Chantilly, Va.

[21] Appl. No.: 39,973

[22] Filed: Mar. 30, 1993

[51] Int. Cl.6 .......................... A23G 3/00; B29C 67/02
[52] U.S. Cl. .......................................... 425/9; 264/8; 264/13; 425/192 S; 425/DIG. 13
[58] Field of Search ...... 425/8, 9, DIG. 13, DIG. 55, 425/192.5; 264/8, 13, DIG. 54

[56] References Cited

U.S. PATENT DOCUMENTS

| | | | |
|---|---|---|---|
| 816,055 | 3/1906 | Zoeller | 425/9 |
| 816,114 | 3/1906 | Morrison | 425/9 |
| 847,366 | 3/1907 | Pollock | 425/9 |
| 1,489,342 | 4/1924 | Brent | 425/9 |
| 1,806,111 | 5/1931 | Moad | 425/9 |
| 3,118,396 | 1/1964 | Brown et al. | 425/9 |
| 4,372,907 | 2/1983 | Herold et al. | 264/DIG. 54 |
| 4,563,488 | 1/1986 | Minami et al. | 264/175 |
| 4,793,782 | 12/1988 | Sullivan | 425/7 |
| 4,855,326 | 8/1989 | Fuisz | 514/777 |
| 4,872,821 | 10/1989 | Weiss | 99/348 |
| 4,873,085 | 10/1989 | Fuisz | 424/400 |
| 4,997,856 | 3/1991 | Fuisz | 514/777 |
| 5,011,532 | 4/1991 | Fuisz | 106/215 |
| 5,028,632 | 7/1991 | Fuisz | 514/772 |
| 5,034,421 | 7/1991 | Fuisz | 514/772 |
| 5,096,492 | 3/1992 | Fuisz | 106/215 |
| 5,145,687 | 9/1992 | Parker | 425/9 |

Primary Examiner—Jay H. Woo
Assistant Examiner—Duane S. Smith
Attorney, Agent, or Firm—Hoffmann & Baron

[57] ABSTRACT

An apparatus for spinning materials, such as thermoflow materials, is disclosed. The apparatus includes a spinner head which is rotatable about an axis. The spinner head includes a heater assembly having an annular heater element, a removable controlled orifice band having a plurality of openings through its thickness and positioned around and in close proximity to the heater element and an annular support ring positioned around the controlled orifice band for holding the heater element and band within the spinner head.

20 Claims, 6 Drawing Sheets

APPARATUS FOR TRANSFORMING THE PHYSICAL STRUCTURE OF THERMO-FLOW MATERIALS

BACKGROUND OF THE INVENTION

The present invention relates to material processing in general, and, more particularly, to a method and apparatus for transforming the physical structure of material.

Various spinning machines have been designed for spinning molten materials, particularly sugar. The materials may be introduced into the spinning machine in molten form or, alternatively, introduced in solid form and melted or subjected to flash flow conditions just prior to being spun out from a spinning assembly of the machine.

U.S. Pat. No. 4,872,821 discloses a spinning machine which is particularly designed for spinning cotton candy. The machine includes a spinner head having a slotted, cylindrical wall and heating elements adjacent to the wall. Sugar in solid form is introduced into the spinner head and propelled against the heating elements where it is melted (i.e., undergoes flash flow transition) and caused to travel through the heating element. The molten sugar is spun out through the slots where it solidifies into the floss-like material known as cotton candy.

The art relating to spinning machines is generally directed to making cotton candy. This machinery performs satisfactorily for converting granular sugar into a floss-like material; however, these machines are not entirely satisfactory for spinning and heating other material which may have properties quite dissimilar to sugar, or which tend to be adversely affected by heat. Additionally, the prior art spinning machines are not adaptable to modify the structure of the material undergoing flash flow.

In commonly-owned U.S. Pat. No. 4,855,326 to Fuisz, a method of producing substances having pharmacological properties is disclosed. The Fuisz '326 patent discloses combining a carrier, such as sugar, with a medicament and spinning the combination into a readily water-soluble floss or fiber. In commonly-owned U.S. Pat. No. 5,011,532 to Fuisz, oleaginous substances, such as vegetable oil, baby oil, margarine, lanolin, cocoa butter and the like, are mixed with a carrier, such as sugar, and melt-spun in a cotton candy spinning machine or the equivalent. As so modified, the products disperse in water forming a colloidal or pseudocolloidal dispersion.

Other disclosures which relate to spinning substances are found in commonly-owned U.S. Pat. No. 4,873,085 to Fuisz, U.S. Pat. No. 5,034,421 to Fuisz, U.S. Pat. No. 5,028,632 to Fuisz, and U.S. Pat. No. 4,997,856 to Fuisz. The products described in the above-mentioned patents and applications are all produced by processing in a cotton candy machine. Illustrative of a cotton candy machine is the Econo Floss Model 3017 manufactured by Gold Medal Products Co., of Cincinnati, Ohio. The process described in the above-identified disclosures involve the use of sugar(s) as a feedstock material which is spun to produce a material such as a floss, fiber, etc.

Still another machine for spinning substances is disclosed in commonly-owned copending U.S. patent application Ser. No. 07/954,257 now abandoned to Fuisz. The application discloses a spinner head including a heating element which defines narrow, elongate openings providing a substantially non-tortuous path through which feedstock material subjected to flash flow is projected.

The use of non-saccharide polymers as biodegradable carriers for various active agents has also been proposed in commonly-owned copending U.S. patent applications to Fuisz, Ser. Nos. 07/893,238 and 07/702,068, now abandoned. The applications disclose biodegradable carriers which are spun with the active agents to produce a solid capable of releasing the active agent over time within the body of a patient.

Machinery currently available has shortcomings which reduce its versatility. If conductive materials are introduced into a spinning machine, an electrical short could occur between heating elements or a heating element and other metal parts of the machine such as the metal band which surrounds many conventional heating elements. Another drawback of conventional spinning machinery is the inability to affect morphology of the resulting product. Conventional machinery also does not offer the user a choice in the size of the openings through which molten materials are caused to pass through prior to being spun out from the spinner head. A need clearly exists for spinning machinery which provides the user with the ability 1) to process many different types of materials without adversely affecting the properties thereof, 2) to produce materials of varied morphology, and 3) to offer a range of dimensions for the openings through which materials are ejected from the spinner head.

It is an object of the invention to provide a new spinning apparatus for processing solid materials by subjecting them to flash flow.

It is another object of the invention to provide a spinning machine capable of handling a wide variety of materials.

A still further object of the invention is to provide a range of dimensions for the openings through which material is processed.

SUMMARY OF THE INVENTION

In accordance with these and other objects of the invention, a spinning machine is provided which includes a spinner head and means for rotating the spinner head about an axis. The spinner head includes a heater assembly which includes an annular heater element, a controlled orifice band having a plurality of openings through its thickness and positioned around and in close proximity to the exterior of the heater element and an annular support ring for holding the heater element and the non-conductive band in close proximity within the heater assembly. The openings in the controlled orifice band are preferably circular, which preferably have a diameter between about 0.01 inches to about 0.05 inches.

The controlled-orifice band is preferably made of a flexible, non-conductive, heat-resistant material. More specifically, typical useful materials are polyimides such as an aromatic polyimide having up to 1% dimethyl acetamide (trade name Kapton ® Polyimide Film manufactured by Dupont), flourine polymers such as polytetraflouroethylene, (trade name Teflon ® also manufactured by Dupont), polycarbonates, polyesters such as poly(ethylene terephthalate), polyamides, polyethers such as polyoxy-methylene, polyacetals, polyolefins such as polystyrene, cellulose esters such as cellulose acetate and poly(vinyl alcohol-coacetal(s)). The band is preferably formed in the shape of a ring and fitted around the heater element.

The controlled-orifice band is easily removed from the heater assembly and can be replaced with a band having different dimensions for the openings in the band. The dimensions of the openings can be selected to obtain a desired morphology for the final product.

A method of transforming the physical structure of a material is also provided by the invention. The method includes the steps of subjecting thermo-flow material to conditions which create flash internal flow by use of a spinner head having a controlled orifice band having a plurality of openings positioned around and in close proximity to a heater element. An annular support ring is used to maintain the positioning of the band around the heater element. Material is introduced into the spinner head and the material is propelled against the heater assembly where it is brought to internal flow condition. The material is projected through the openings in the controlled orifice band. In accordance with the present invention, the form of the material expelled from the spinner head is dependent upon the size of the openings in the controlled orifice band, the temperature of the heater element and the speed of rotation of the spinner head.

Thus, the present invention provides a spinning machine having the versatility to process many different types of materials having varied characteristics. The removable controlled orifice band can be chosen for the specific material being processed and the desired morphology of the resultant product. The removable band offers a range of dimensions and shapes for the openings through which feedstock materials are ejected from the spinner head following flash internal flow to produce a resultant product having a desired morphology.

DETAILED DESCRIPTION OF THE INVENTION

Figure 1:
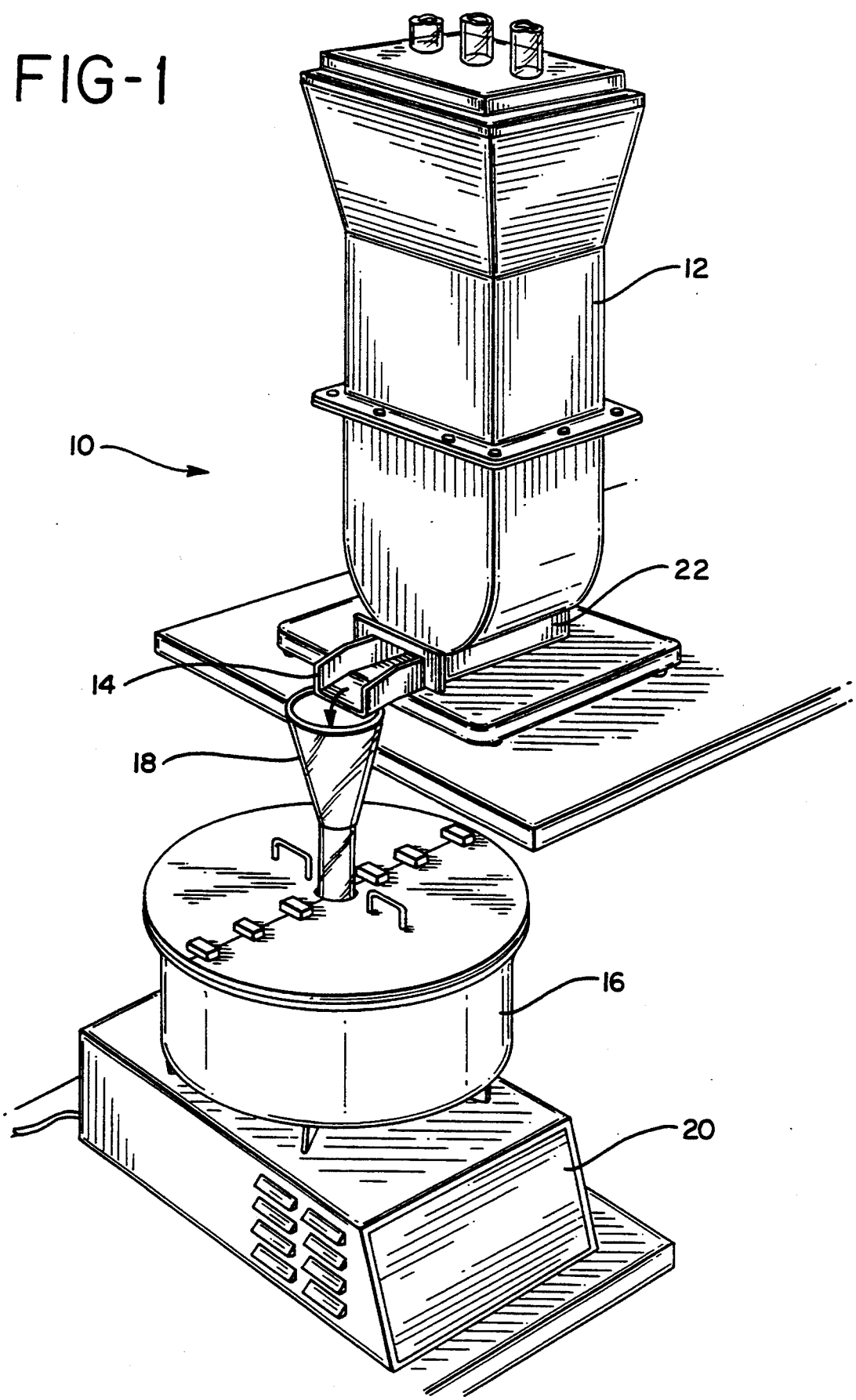
FIG. 1 is a perspective view of an assembly for processing thermo-flow materials.

A method and apparatus is provided for subjecting materials to a flash flow process and subjecting them to centrifugal forces by a spinner head.

"Flash flow" is referred to in the present application as a phenomenon which occurs when a solid carrier material (e.g., thermoplastic material) is subjected to conditions of temperature and shear sufficient to provide internal flow at a subparticle level. This condition produces a transformation of physical and/or chemical structure without degradation of the material. Internal flow occurs when the infrastructure of the material breaks down sufficiently to permit movement of the material at a subparticle level, and probably at a molecular level. At a molecular level, internal flow contemplates the movement of molecules relative to each other.

"Thermo-flow" as used herein refers to solid materials which flow when heated, i.e., they undergo intraparticle flow when heated prior to undergoing substantial degradation or decomposition. Thermo-flow as used herein includes thermoplastic polymers as well as materials such as sugars, saccharides, polysaccharides, etc., which exhibit intraparticle flow when heated. Examples of such materials are sugars as disclosed in U.S. Pat. No. 4,855,326 issued Aug. 8, 1989, polydextroses as disclosed in U.S. Pat. No. 5,279,849 issued on Jan. 18, 1994, maltodextrins (including corn syrup solids) as disclosed in U.S. Ser. No. 847,595 filed Mar. 5, 1992, now U.S. Pat. No. 5,387, 431, and thermoplastic polymers such as disclosed in U.S. Ser. No. PCT/US92/04053 filed May 13, 1992, and biodegradable polymers as disclosed in U.S. Ser. No. 893,238 filed Jun. 3, 1992, all of which are incorporated herein by reference.

In the present invention, thermo-flow material is subjected to flash flow sufficiently to deform and pass through an opening under an amount of force. The force used in the present invention is centrifugal force provided by a spinner head from which the flowable material is thrown at high speed. No external force is imposed on the flowable material after it is flung out of the spinning head other than resistance provided by ambient air. The thermo-flow material instantaneously reforms as a solid having altered physical and/or chemical structure. The altered structure results from the forces acting on the material as it exits the head and is hurled outwardly during the brief period during which it experiences flash flow.

The flash flow phenomenon of the present invention occurs in not more than one second, preferably on the order of tenths of seconds, e.g., not more than about 0.4 seconds, and most preferably on the order of milliseconds and most preferably not more than 0.1 seconds. This unique phenomenon can be produced by relatively high speed distribution of the thermo-flow material to an environment of elevated temperature under a constant force, such as centrifugal force, caused by high speed rotation of a spinner head. The spinner head according to the invention is designed to maintain the dwell time of the material during which it undergoes the flash flow transition within the parameters set forth above. The important aspect is that the flash flow phenomena be induced in a solid feedstock for rapid transition to solid material having an altered structure different from that of the feedstock, but without degradation of the material.

Referring now to the drawings, FIG. 1 shows an assembly 10 for feeding materials to a spinner head where they may be subjected to a flash flow process and collected in a basin or basket. The assembly includes a hopper 12, a chute 14, a basin 16, a spinner head (not shown) positioned within the basin 16, a funnel 18 for directing material from the chute 14 to the spinner head, and a base 20. The base includes a motor (not shown) for driving the spinner head in a known manner as described in U.S. Pat. No. 4,872,821, (incorporated by reference herein), which has been converted to a variable speed drive system. A feeder assembly 22 is positioned at the base of the hopper, the chute 14 extending therefrom. The feeder assembly may include a screwtype feeder or the like for moving material from the hopper to the funnel 18.

Figure 2:
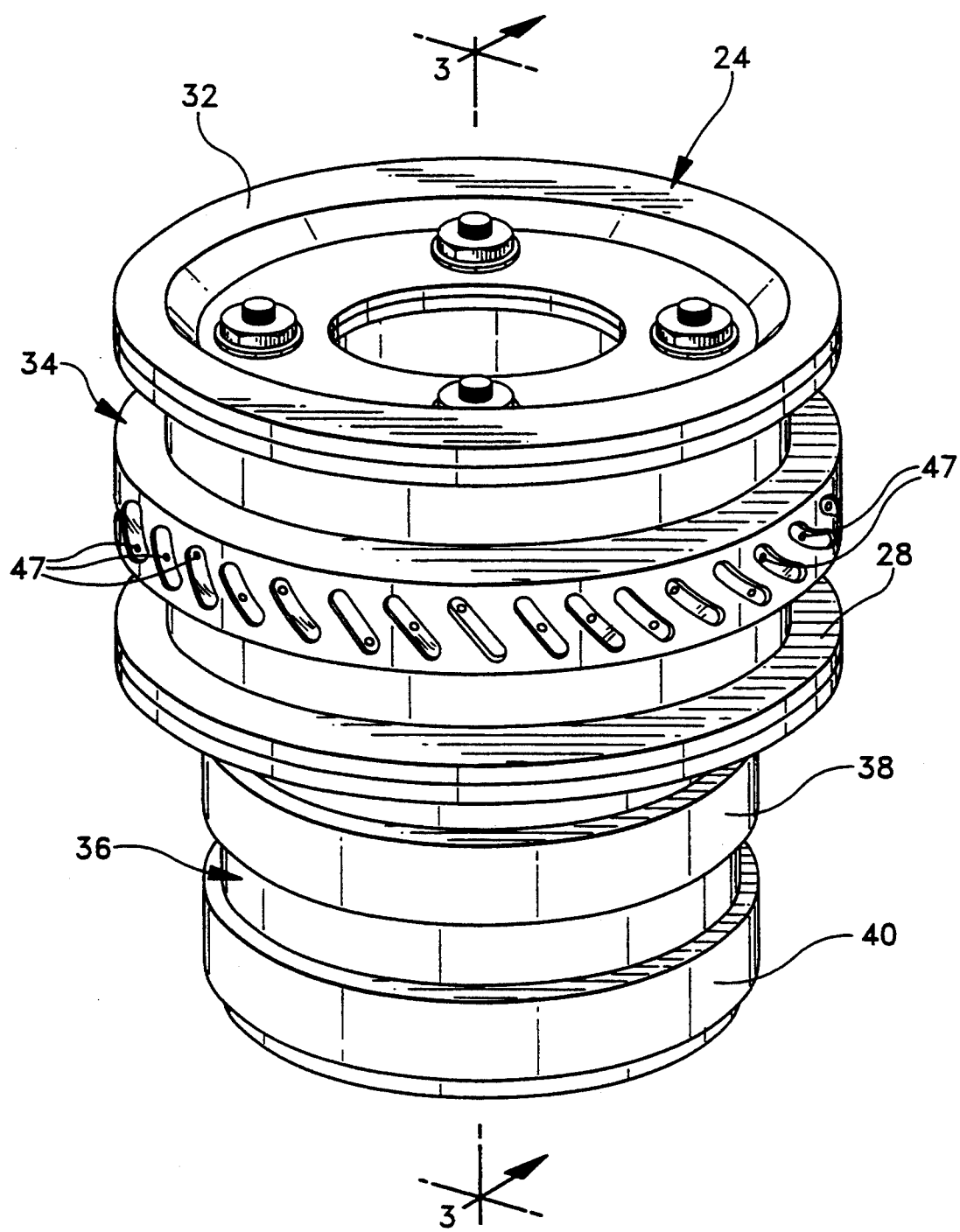
FIG. 2 is a top perspective view of a spinner head in accordance with the present invention.
Figure 3:
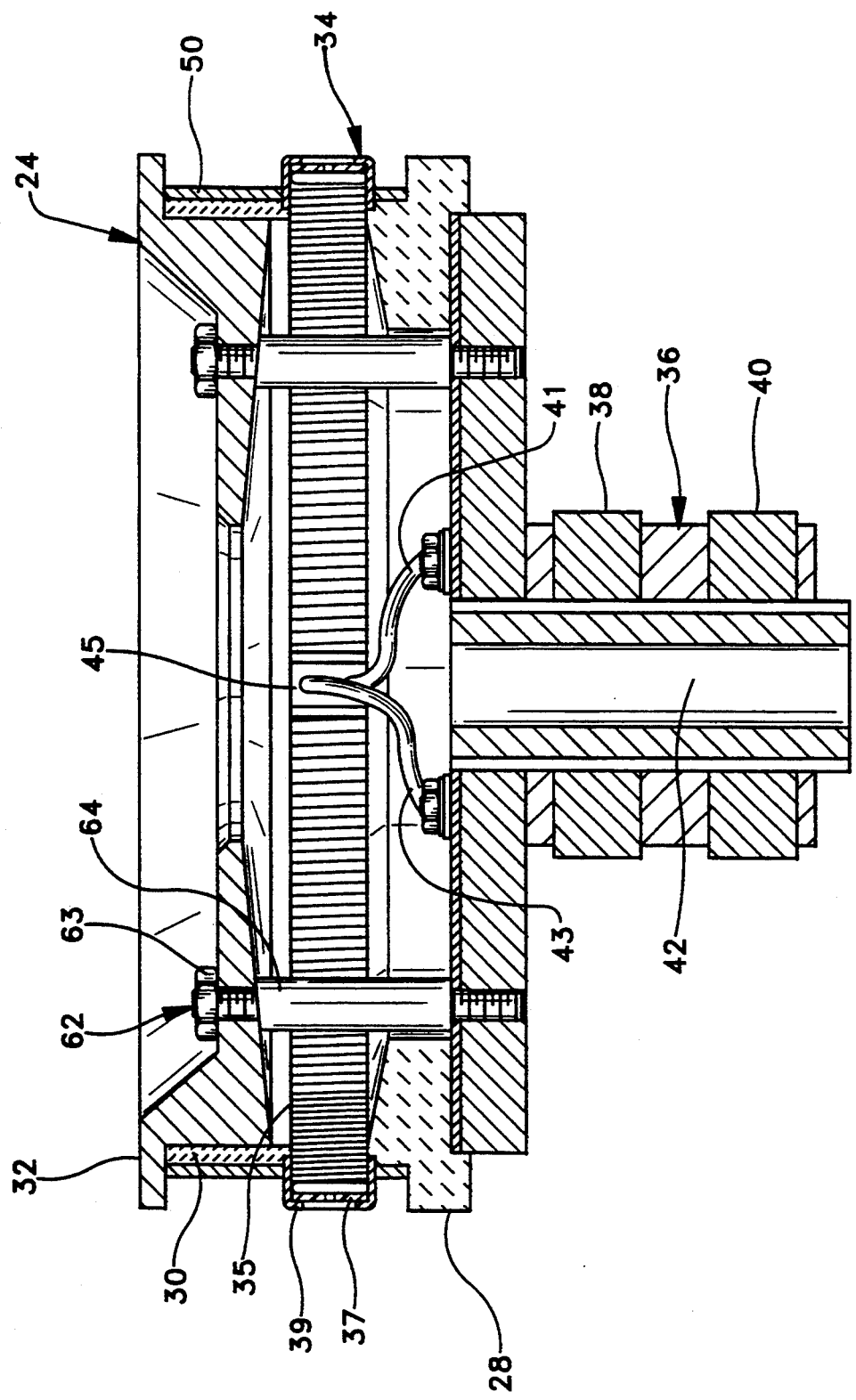
FIG. 3 is a cross-sectional view thereof taken along line 3—3 of FIG. 2.

FIGS. 2-3 show a spinner head 24 according an embodiment of the present invention. The spinner head includes a base member 26, a bottom insulating ring 28, a top insulating ring 30, an aluminum cap 32, and a heater assembly 34. The heater assembly includes a heater element 35, a non-conductive band 37 positioned around the heater element and an annular support ring 39 for maintaining the positioning of the elements of the heater assembly. The base and cap may be made from stainless steel or other suitable material, while the insulating rings are preferably made from a ceramic material or a heat resistant polymer. The cap includes an opening aligned with the funnel 18. A stem 36 extends from the base. The stem includes slip rings 38,40 which are engaged by brushes (not shown), and an upright shaft 42 which is driven by the motor within the base 20. The stem and heater element 35 are similar to that disclosed in U.S. Pat. No. 4,872,821 which has been incorporated herein by reference, and both function in a similar manner. Accordingly, although not shown, the heater element leads 41,43 are electrically coupled to brushes 38,40, respectively, for current input to the heater element.

The insulating ring 30 is positioned between an upper shell 50 which defines an outer surface portion of the spinner head. The ring may be made from any suitable material which provides heat and electrical insulation. A thermocouple or some similar heat sensing device (not shown) may be incorporated within the heater assembly 34 so that temperature can be monitored. Four assemblies 62, each including a ceramic sleeve 64, hold the parts comprising the spinner head together. The assemblies include a nut fastener 63 at the top of the cap 32 and an externally threaded fastening portion at the bottom for cooperative attachment to internally threaded receiving portion in the base 26.

Figure 4:
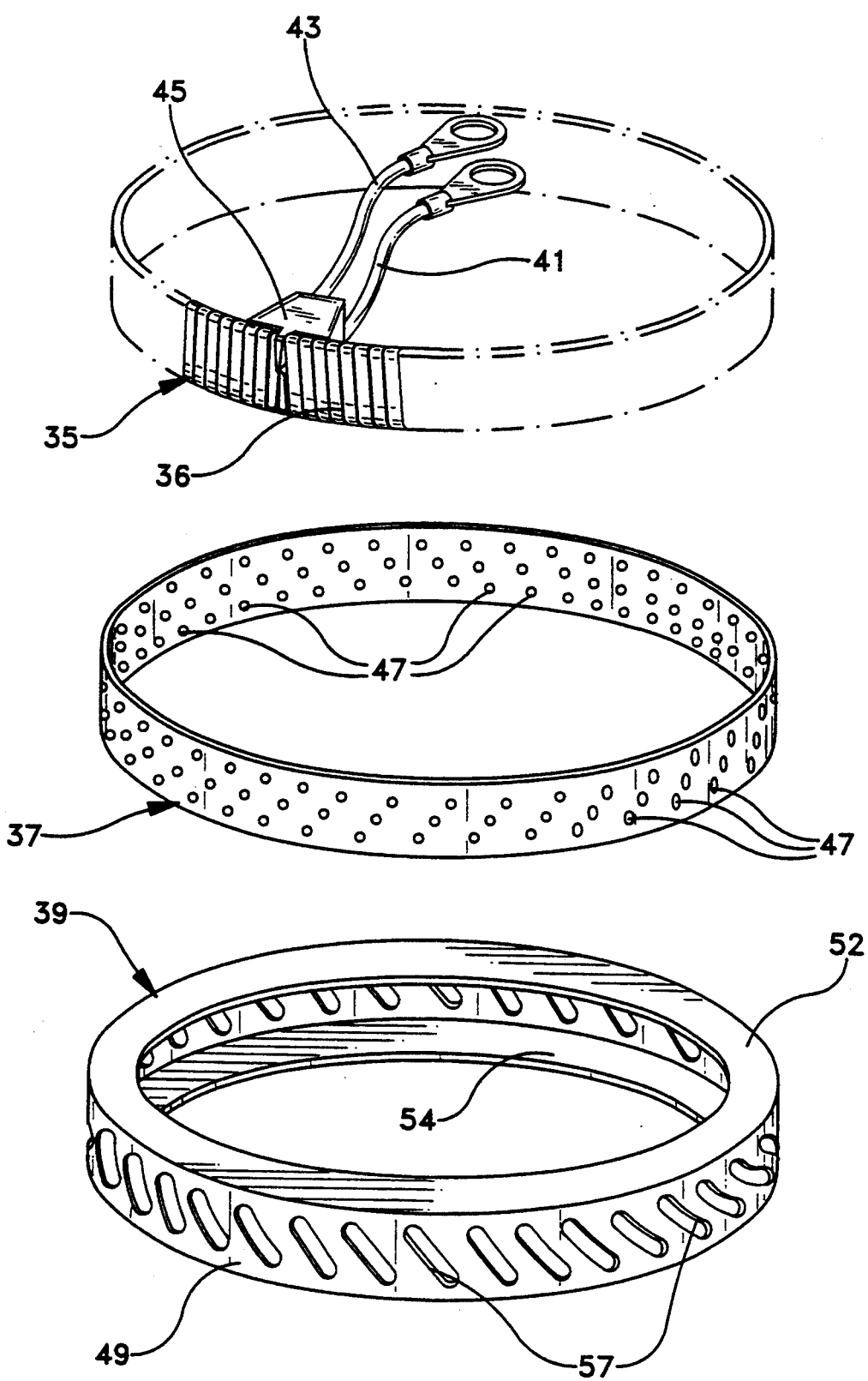
FIG. 4 is an exploded view of a heater assembly in accordance with the present invention.
Figure 5:
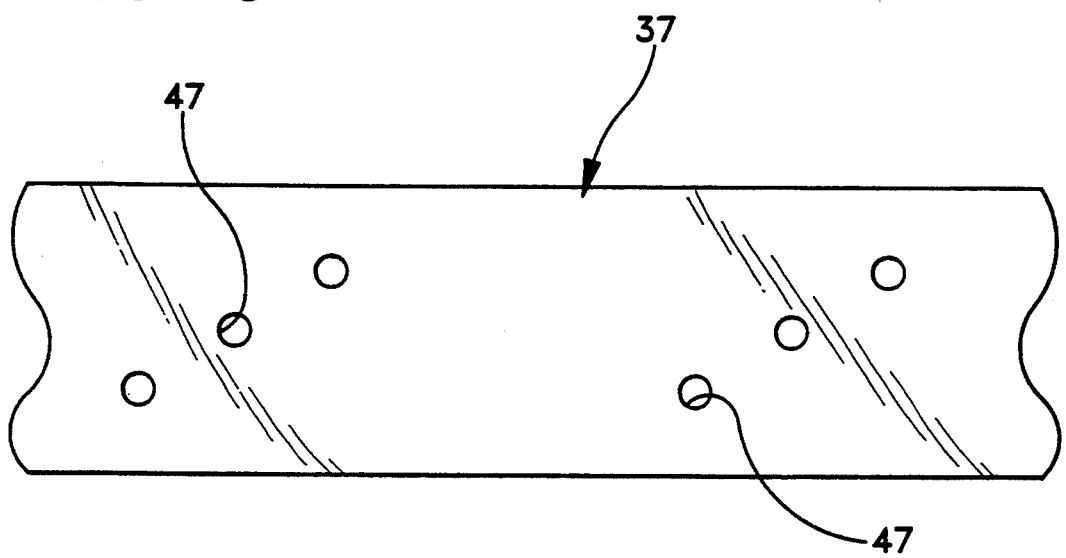
FIG. 5 is an enlarged side view of a section of a controlled orifice band according to a first embodiment of the present invention.

The heater assembly 34 is shown in FIG. 4 in an exploded view to illustrate each of the elements within the assembly. An annular heater element 35 is in the innermost position of the heater assembly. The heater element 35 is made of a narrow ribbon of resistance wire wound in a flat coil. A small space or slot 36 is provided between each turn of the coil of the heater element so that material undergoing flash flow can pass therethrough. Generally, the heater element coil has a space or slot between each coil approximately 0.02 to about 0.03 inches wide. The ends of the resistance wire are electrically coupled to leads 41,43 within an insulator 45 positioned on the interior surface of the heater element. The leads 41,43 may include additional insulators in the form of ring-like structures (not shown) to protect the leads from the heat generated by the heater element.

A controlled orifice band 37 having a plurality of openings 47 is positioned around and in close proximity to the exterior surface of the heater element 35. The band is preferably made of a thin, flexible, heat-resistant material. Typical useful materials suitable for forming the band include, but are not limited to polycarbonates, polyesters such as poly(ethylene terephthalate), polyamides, polyethers such as polyoxymethylene, polyacetals, polyolefins such as polystyrene, cellulose esters such as cellulose acetate and poly(vinyl alcoholcoacetal(s)), aromatic polymides having up to 10% dimethyl acetamide such as a product manufactured by Dupont under the trademark Kapton ® Polyimide Film and polytetraflouroethylene (also manufactured by Dupont under the trademark Teflon ®). Additionally, the heat resistant material is preferably non-conductive and has a dielectric strength greater than 5.75 V/micron.

The band 37 includes a plurality of openings 47 through which material which has undergone flash flow is forced due to centrifugal force of the spinner head rotating at high speed. In a preferred embodiment of the invention, the openings 47 in the band are substantially circular and have a diameter ranging from about 0.01 inches to about 0.05 inches. The openings in the controlled orifice band may be made by drilling the holes with sharp, high-speed drills. Preferably, the openings are made by die cutting or punching the holes with a shaped die. Alternatively, hypodermic needles having the proper diameter may be ground to provide a flat tip which is suitable for die cutting the non-conductive band openings. The size and shape of the openings can be varied to facilitate processing of the material being fed into the machine and to affect the morphology of the resulting product. An advantage of the use of the band 37 is that it is easily changed as desired or required.

The final element making up the heater assembly 34 is an annular support ring 39. The annular support ring 39 is positioned around the heater element 35 and controlled orifice band. The annular support ring 39 functions to hold the heater assembly together and maintain the controlled orifice band in close proximity to the exterior surface of the heater element. Additionally, the heater assembly spins along with the spinner head thus providing centrifugal force upon the heater assembly such that the heater element 35 is held firmly against the non-conductive band 37 and together are pressed firmly against the annular support ring 39 so that feedstock does not flow around the edges of the controlled orifice band 37. As illustrated in FIG. 4, the annular support ring can be generally channel-shaped in section. The exterior wall 49 is provided with slots 51 and has upper and lower flanges, 52 and 54, respectively, coupled to the upper and lower edges of the exterior wall 49.

A feature of the heater assembly 34 of the present invention is that the openings in the controlled orifice band 37 are strategically positioned so that each space or slot 36 between the coils of the heating element 35 aligns with at least one opening in the controlled orifice band 37. Additionally, the openings in the non-conductive band must align with the slots 51 in the outer annular support ring 39. It has been found that when the spinner head is spinning at high speeds, the heater element tends to float and move slightly within the heater assembly while the controlled orifice band tends to be firmly set against the outer annular ring due to centrifugal force. Thus, by strategically positioning the openings 47 in the controlled orifice band on a diagonal as shown in FIG. 4, taking into account the width of the spaces 36 in the heater element 35, any movement of the heater element will not affect the alignment of each space 36 in the heater element with at least one opening 47 in the controlled orifice band so that the flowable feedstock can readily travel through the aligned opening.

As previously described, the openings in the band also align with the slots 51 in the annular support ring 39 permitting material to be propelled through the band openings for collection in the basin. In the embodiment shown in FIG. 4, the openings in the controlled orifice band are formed at an angle from the perpendicular opposite to that of the slots 51 in the annular support ring 39 so that no matter how the band 37 is positioned, at least one opening 47 in the band will align with each slot 51 formed in the annular support ring. The slots formed in the annular support ring may be a variety of shapes and sizes. The annular support ring generally functions to hold the heater assembly together and to maintain the controlled orifice band in close proximity to the exterior surface of the heater element.

Figure 7:
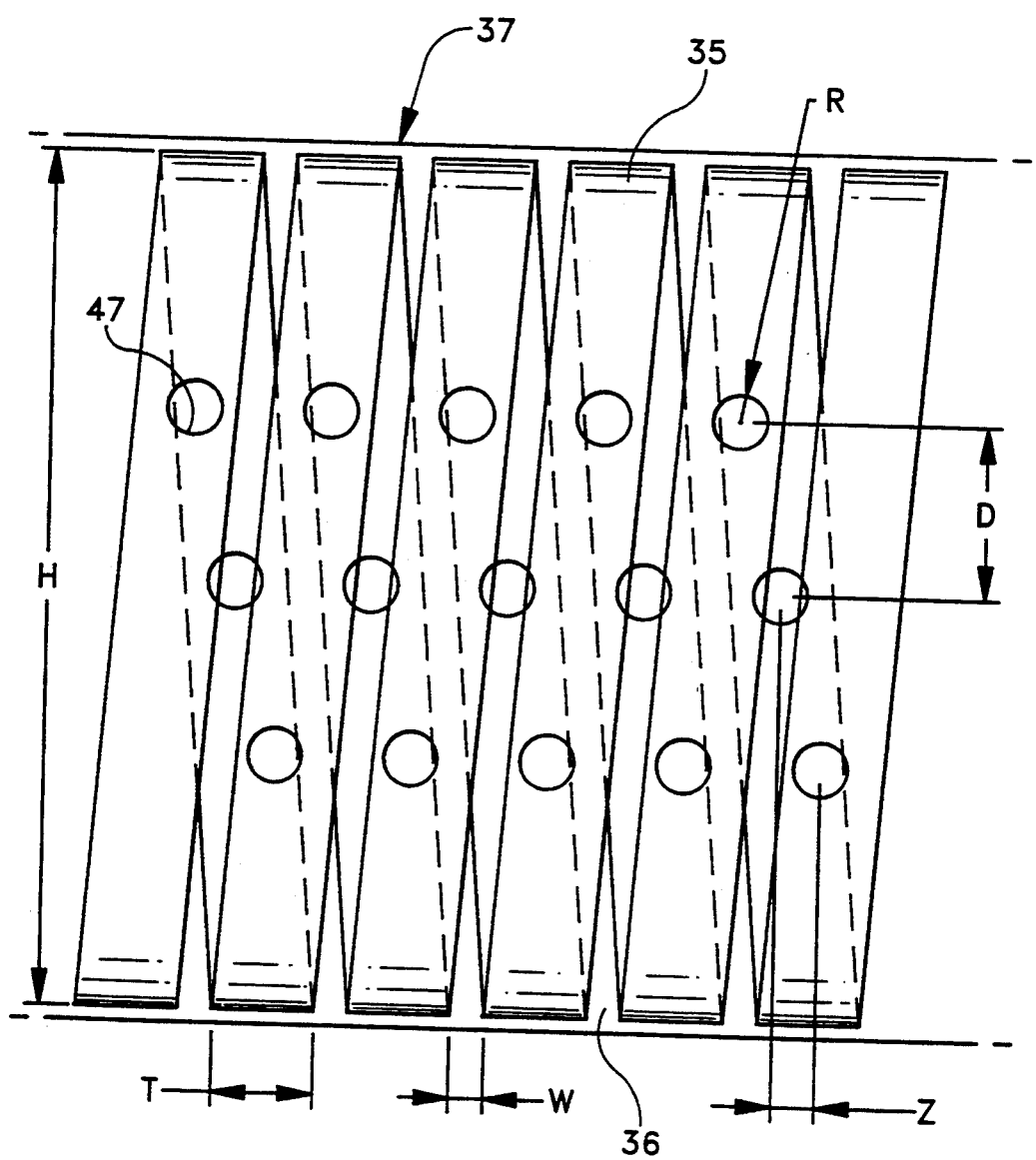
FIG. 7 is an enlarged side view of a section of a heater element and a controlled orifice band formed in accordance with the present invention.

The desired opening configuration for the controlled orifice band is dependent upon the size of the space or slot 36 in between the coils of the heater element 35. Additionally, the combination of the size of the slots 36 in the heater element 35 and the size of the openings 47 in the band provides the working orifice for flow of material through the heater assembly 34. The desired opening diameter and spacing for the openings in the band can be expressed by the following equation for the optimum horizontal spacing:

$$Z = 2R - (T + W)D/2H$$

wherein R is the desired hole diameter in the band, D is the vertically spaced distance between the center of each opening in the band, Z is the horizontally spaced distance between the center of each opening in the band and T, W and H are specific dimensions relating to the heater element. As illustrated in FIG. 7, which is an enlarged side view of a portion of the heater element and band, H is the height of the heater element coil, T is the width of the narrow ribbon of resistance wire wound to form the coil and W is the slot formed between the windings of the heater element coil.

As illustrated in FIG. 7, if the dimensions of the heater element are H=0.5 inches, T=0.06 inches and W=0.02, and a radius R of 0.015 inches is desired for the openings in the non-conductive band, a vertically spaced distance D of 0.1 inches is desired, then the horizontally spaced distance Z for the openings in the band should be 0.022 inches for optimum opening positioning.

Figure 6:
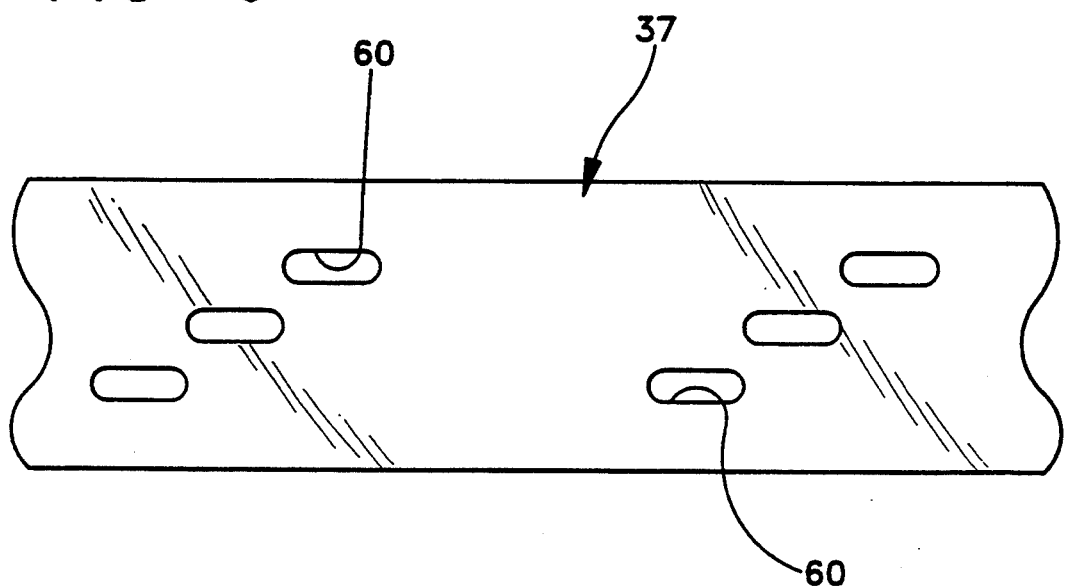
FIG. 6 is an enlarged side view of a section of a controlled orifice band according to a second embodiment of the present invention.

An alternative embodiment of the present invention is illustrated in FIG. 6. The controlled orifice band 37 through which the material is propelled following flash flow includes a plurality of oblong or slotted openings 60. If oblong or slotted openings 60 are used in the band, the height of the opening measured in the direction of the heating element slot is preferably from about 0.010 to about 0.05 inches. As previously mentioned, the shape of the openings can affect both the processability of the feedstock material and the morphology of the resultant product.

In operation, a thermo-flow material or combination of materials is introduced into the hopper 12. The feeder 22 conveys these materials into the spinner head 24. The spinner head is caused to rotate at a selected speed about the axis of the shaft 42, causing the materials to be propelled directly against the substantially cylindrical wall defined by the heater assembly. The materials are subjected to sufficient heat to create an internal flow condition so that they pass through the spaces 36 in the heater element 35 and subsequently pass through the openings 47 formed in the controlled orifice band 37 which are aligned with the spaces in the heater element. The materials are projected from the opening in the band directly into the basin 16 due to the centrifugal force generated upon rotation of the spinner head.

The morphology of the finished product, which reforms as a solid upon exiting the spinner head, depends upon the speed at which the spinner head is rotated, the temperature maintained by the heating element and the size and shape of the openings formed in the controlled orifice band. The spinning of sucrose solids, for example, results in the generation of fine floss. Smaller diameter openings in the band produces a finer floss. Higher temperatures cause smaller diameter floss to be produced than lower temperatures. Higher revolutions per minute of the spinner head also produces smaller diameter floss. Accordingly, by changing the temperature of the heating element, the rotational speed of the spinner head or the size and configuration of the openings formed in the band, the morphology of the resulting product may be carefully controlled to produce a desired structure. Thus, the system of the present invention significantly enhances the ability of the artisan to process material and affect the form of the product.

EXAMPLES

A spinning machine having a spinner head as shown in FIGS. 2–3 having a 7 inch diameter was used to process various materials as follows:

| Feedstock Material | Heating Element Temperature | Hole Diameter (inches) | Spinner Head Speed | Product Type |
| --- | --- | --- | --- | --- |
| 1. Polyanhyride | 120° C. | 0.032 | 4500 | fluff |
| 2. Polyglactin | 135° C. | 0.02 | 4500 | strands |
| 3. Polyglactin | 90° C.–135° C. | 0.053 | 3600 | long strands |
| 4. Polyglactin | 100° C.–130° C. | 0.032 | 3600 | long strands |
| 5. Sucrose | 175° C.–180° C. | 0.013 | 3600 | tan floss |

The feedstocks listed above were processed with negligible waste and excellent reproducibility. The feedstock was fed into the spinner head at a rate such that no substantial accumulation of feedstock was present in the spinner head. It is important that the feed rate be substantially the same as the output so that heat exposure time is kept to a minimum. Accordingly, when the feedstock reaches its flow point, it should pass through the heater element and controlled orifice band openings. Since the heater assembly has a limited number of openings, the flowable feedstock material can accumulate if the feedstock material is fed too fast and the temperature of the feedstock material could increase to a point so that the material degrades.

The morphology of the resultant processed feedstock material was controlled by varying the speed of rotation of the spinner head, the temperature of the heater element and the dimensions of the openings in the non-conductive band.

While the preferred embodiments of the invention have been shown and described herein, it will be appreciated by those skilled in the art that various approaches may be taken for providing a heater assembly including a heater element, a controlled orifice band having a plurality of openings, and an annular support ring to maintain the band in position around and in close proximity to the heater element. For example, the band may be made from a number of heat-resistant materials. The specific materials identified in the disclosure may be replaced by other materials without materially affecting the operation of the spinner head according to the invention. The invention accordingly is not limited to the precise embodiments disclosed, and various other changes and modifications may be affected therein by one skilled in the art without departing from the scope or spirit of the invention.

What is claimed is:

1. A spinning machine comprising:
    a spinner head including a chamber and a heater assembly defining a wall of said chamber;
    means for rotating said spinner head about an axis,
    said heater assembly including an annular heater element, the heater element including a plurality of spaces through which material undergoing flash flow pass, a removable non-conductive band having a plurality of openings therethrough and positioned around and in close proximity to said heater element, and an annular support ring, the annular support ring having openings therein and positioned around said band for holding said heater element and said band within said spinner head, wherein a combination of a size of the spaces in the heater element and a size and shape of the openings in the non-conductive band provides a working orifice for flow of material through said heater assembly to produce a resultant product having a desired morphology.

2. A spinning machine as defined in claim 1, wherein said spinner head further comprises a base portion, and a cap portion, said heater assembly being positioned between said base and cap portions.

3. A spinning machine as defined in claim 1, further comprising:
    a basin, said spinner head being positioned within said basin for receipt of a material being processed in said spinner head.

4. A spinning machine as defined in claim 1, wherein said plurality of openings in said non-conductive band are substantially circular having a diameter ranging from about 0.01 inches to about 0.05 inches.

5. A spinning machine as defined in claim 1, wherein said non-conductive band comprises a heat-resistant material.

6. A spinning machine as defined in claim 5, wherein said heat-resistant material comprises aromatic polyimide having up to 1% dimethyl acetamide.

7. A spinning machine as defined in claim 1, wherein said band comprises polytetraflouroethylene.

8. A spinning machine as defined in claim 1, wherein said annular support ring includes a plurality of slotted openings and wherein the non-conductive band openings are arranged such that an opening in said non-conductive band aligns with each of said plurality of slotted openings so that feedstock material undergoing flash flow passes through the aligned support ring slots and band openings.

9. A spinning machine as defined in claim 1, wherein the heater element comprises a narrow ribbon of resistance wire wound in a flat coil having spaces between each coil so that feedstock material undergoing flash flow passes therethrough.

10. A spinning machine as defined in claim 9, wherein the band openings are arranged so that an opening of the band aligns with each space between the coils of the heating element and feedstock material undergoing flash flow passes through the aligned coil spaces and band openings.

11. A spinning machine as defined by claim 1, wherein the non-conductive material has a dielectric strength greater than 5.75 v/micron.

12. A spinner head comprising:
    a base portion;
    a cap portion;
    a heater assembly mounted between said base and cap portions, said heater assembly including an annular heater element, the heater element including a plurality of spaces through which material undergoing flash flow pass, a removable non-conductive band having a plurality of openings therethrough and positioned around and in close proximity to said heater element, and an annular support ring, the annular support ring having openings therein and positioned around said band for maintaining said heater element and said non-conductive band in close proximity;
    a chamber defined by said base portion, heater assembly and cap portion;
    an opening defined within said cap portion for introducing material into said chamber;
    whereby said heater assembly provides a path for said material for processing by undergoing flash flow and being projected therefrom for resolidifying and wherein a combination of a size of the heater element spaces and a size and shape of the openings in the band produce a resultant product having a desired morphology.

13. A spinner head as defined in claim 12, wherein said band openings are substantially circular and each has a diameter ranging from about 0.01 inches to about 0.05 inches.

14. A spinner head as defined in claim 12, wherein said band comprises heat-resistant material.

15. A spinner head as defined in claim 14, wherein said heat-resistant material comprises aromatic polyimide having up to 1% dimethyl acetamide.

16. A spinner head as defined in claim 12, wherein said band comprises polytetraflouroethylene.

17. A spinner head as defined in claim 12, wherein said annular support ring includes a plurality of slotted openings and wherein the non-conductive band openings are arranged such that an opening in said non-conductive band aligns with each of said plurality of slotted openings so that feedstock material undergoing flash flow passes through the aligned support ring slots and band openings.

18. A spinner head as defined in claim 16, wherein each non-conductive material has a dielectric strength greater than 5.75 v/micron.

19. A spinning machine as defined in claim 12, wherein the heater element comprises a narrow ribbon of resistance wire wound in a flat coil having spaces between each coil so that feedstock material undergoing flash flow passes therethrough.

20. A spinning machine as defined in claim 19, wherein the band openings are arranged so that an opening of the band aligns with each space between the coils of the heating element and said material undergoing flash flow passes through said aligned band openings and heater element spaces.

* * * * *